G. J. COOPER.
INTERNAL COMBUSTION ENGINE.
APPLICATION FILED APR. 4, 1916.
1,237,302.
Patented Aug. 21, 1917.
5 SHEETS—SHEET 1.
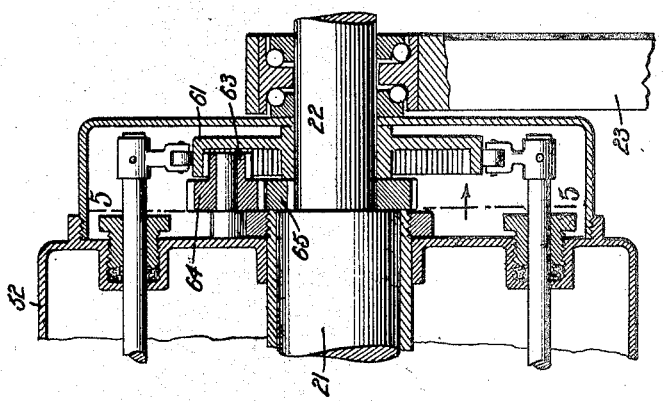
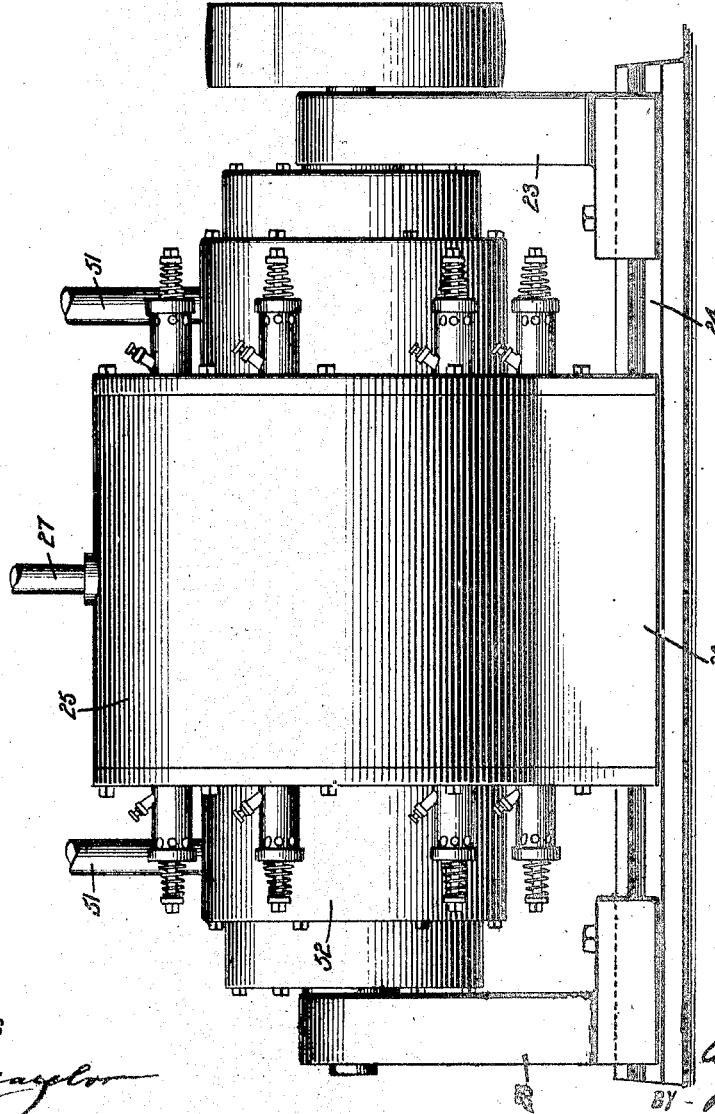
WITNESSES
INVENTOR
G. J. Cooper
BY
ATTORNEYS

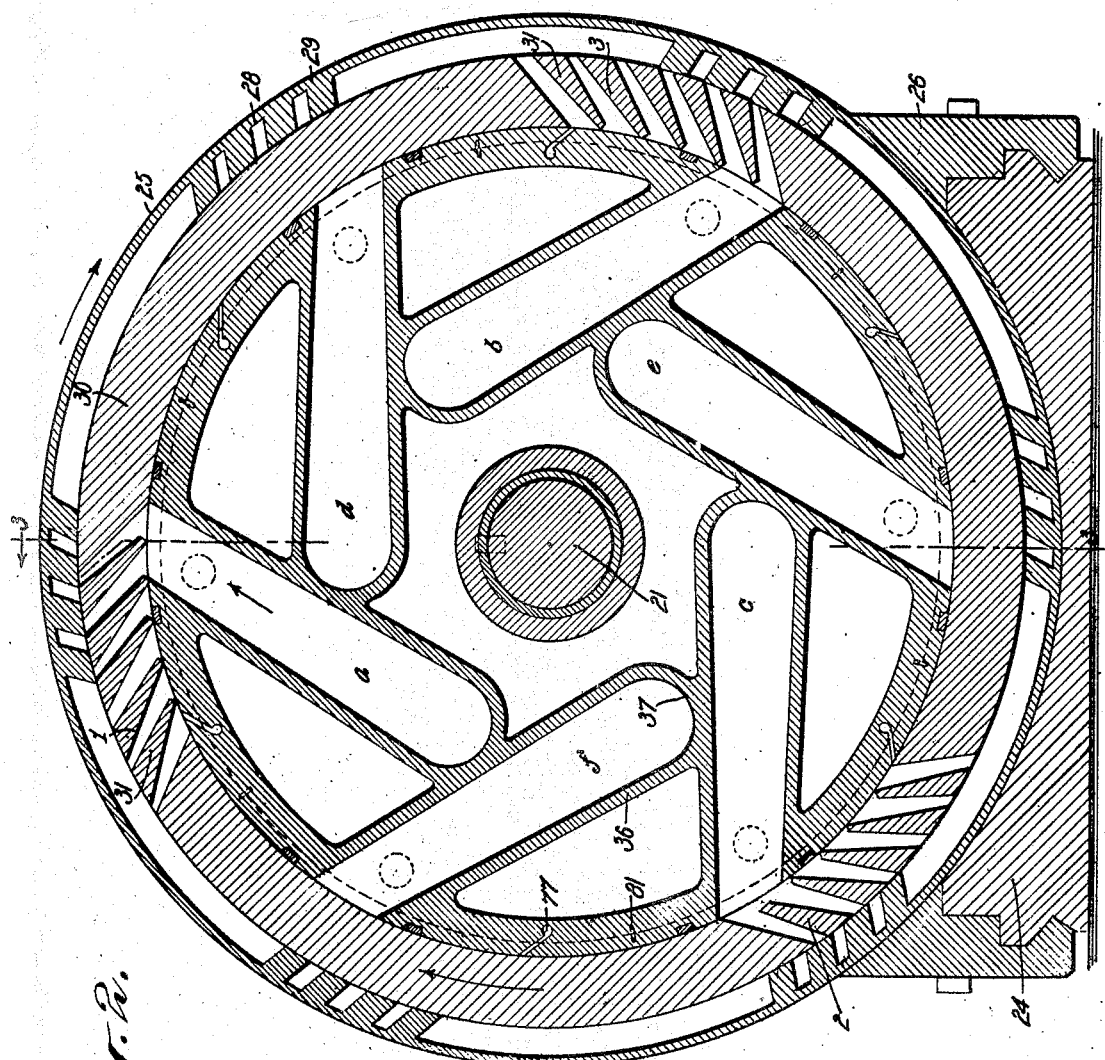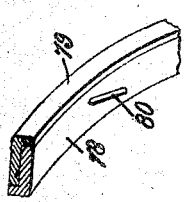

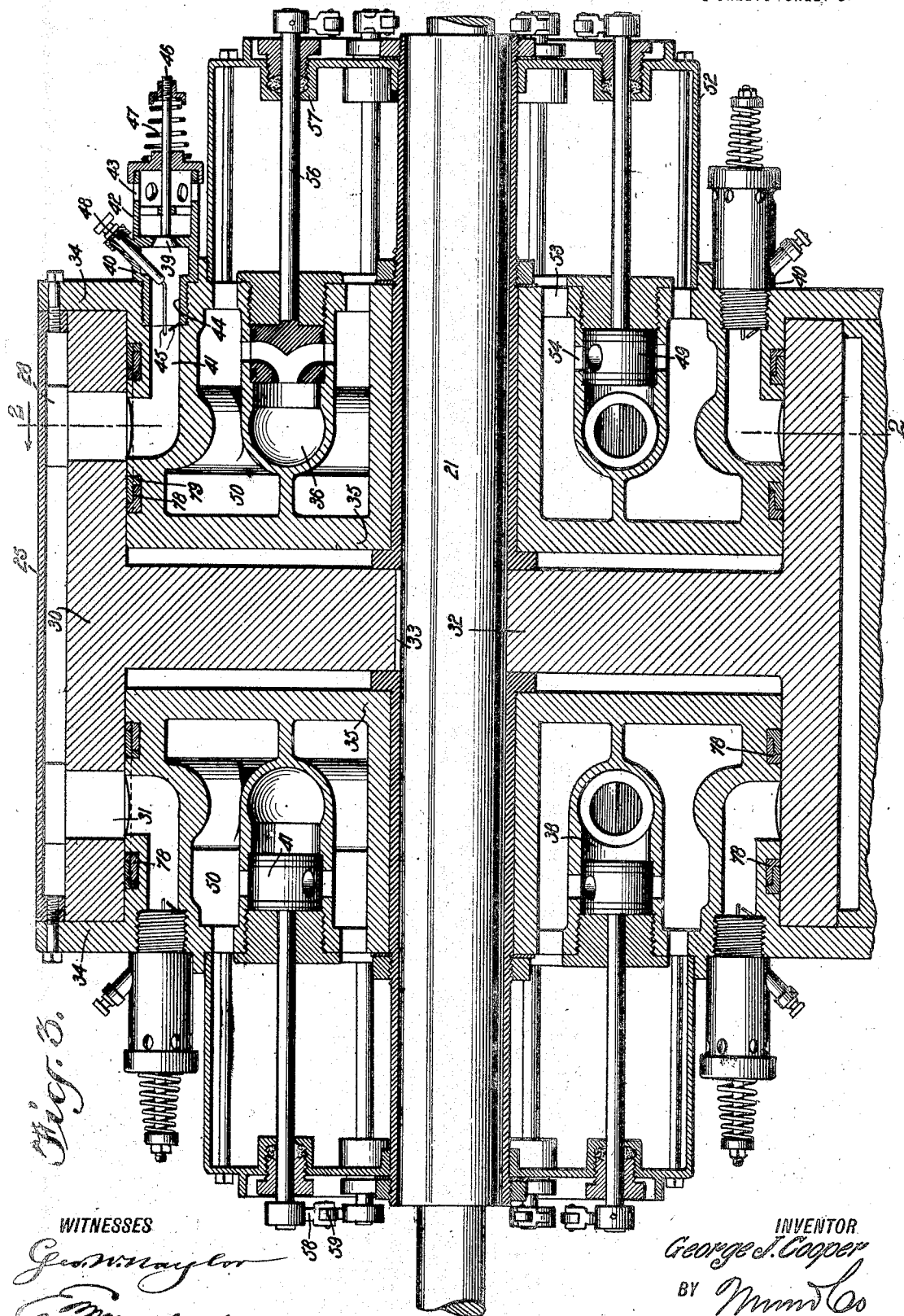

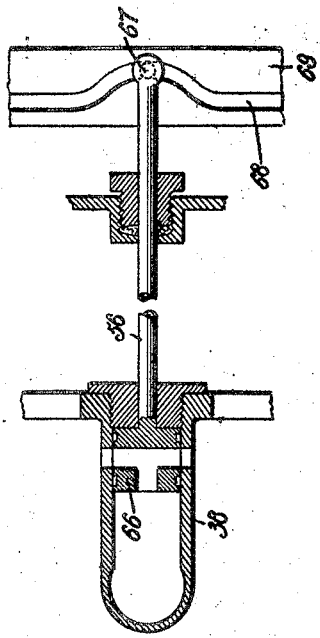
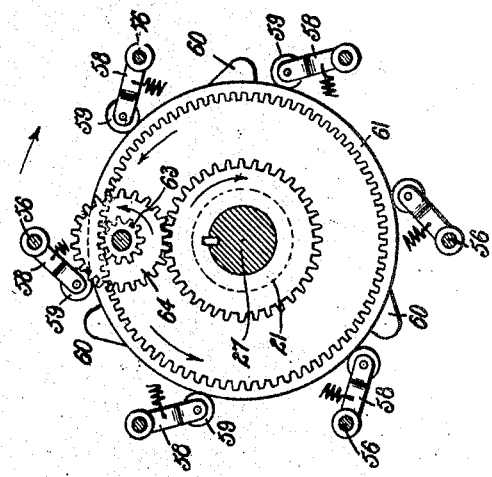

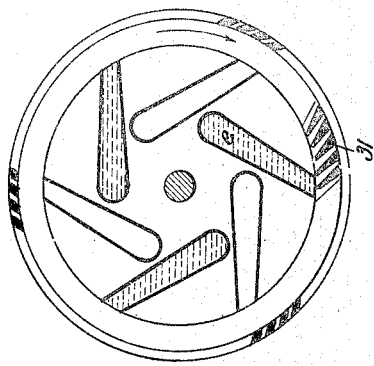
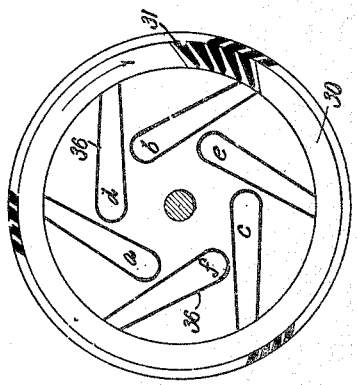
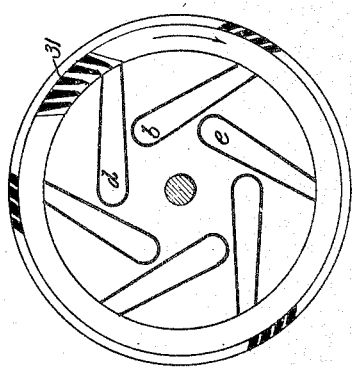
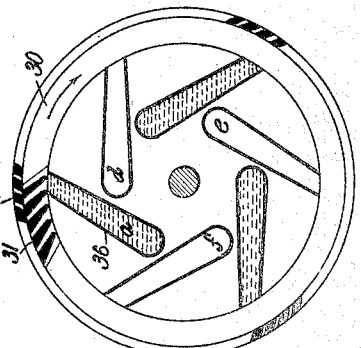
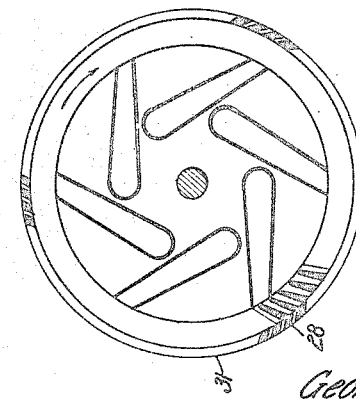

UNITED STATES PATENT OFFICE.

GEORGE JAMES COOPER, OF HAVRE, MONTANA.

INTERNAL-COMBUSTION ENGINE.

1,237,302.  Specification of Letters Patent.  Patented Aug. 21, 1917.

Application filed April 4, 1916. Serial No. 88,821.

*To all whom it may concern:*

Be it known that I, GEORGE J. COOPER, a citizen of the United States, and a resident of Havre, in the county of Hill and State of Montana, have invented a new and Improved Internal-Combustion Engine, of which the following is a full, clear, and exact description.

Among the principal objects which the present invention has in view are: to drive a rotor by means of expanding gases delivered by a stationary member having a plurality of delivery channels for operating upon said rotor; and to provide means for delivering a plurality of rotary impulses on said rotor during the revolution thereof.

*Drawings.*

Figure 1 is a side elevation of an engine constructed and arranged in accordance with the present invention;

Fig. 2 is a cross section of the same on an enlarged scale, the section being taken as on the line 2—2 in Fig. 3;

Fig. 3 is a longitudinal section, the section being taken as on the line 3—3 in Fig. 2, the timing gear, case therefor, and bearing standards being omitted;

Fig. 4 is a view supplemental to Fig. 3, showing the timing gears, case therefor, and a fragment of the adjacent bearing standard omitted in the former figure;

Fig. 5 is a cross section taken as on the line 5—5 in Fig. 4, showing a side elevation of the timing gear for charging the explosion chambers;

Fig. 6 is a detail view in perspective on an enlarged scale, showing packing rings used for closing the joints between the stationary casing and rotor of the present engine;

Figs. 7, 8, 9, 10, 11 and 12 are views diagrammatic in form, showing the operative relation of the rotor vanes and escapement sections operated thereon by the expanding medium when escaping from the explosion chambers, the rotor being shown as having one set of vanes, and the casing being shown as having three sets of escapement sections;

Fig. 13 is a diagrammatic view showing in platted form, the staggered relation of the vanes in different portions of the rotor;

Fig. 14 is a detail view showing a modified form of valve and operating mechanism therefor for regulating the delivery of explosive fuel to the explosion chambers.

*Description.*

As seen in the accompanying drawings, the driving shaft 21 has reduced ends 22 supported in suitable bearings in standards 23. The standards 23 are slidably mounted on a base plate 24, which also carries or supports a cylindrical casing 25. Cheek plates 26 employed for this purpose, are rigidly connected with the casing 25, as shown best in Fig. 3 of the drawings. The casing 25 is centrally provided with an exhaust pipe 27, from which the exhaust products of combustion are delivered from the interior of the casing. The casing is also provided at intervals, with short partially inclined abutments 28, which abutments form open-ended passages 29, disposed transverse to the rotary direction of the rotor 30. The passages 29 and abutments 28 forming the same, are inclined outwardly toward said direction of rotation of said rotor in opposition to the inclination of the vanes 31 with which said rotor is provided.

The rotor 30, as shown best in Fig. 3 of the drawings, is a hollow cylinder, the outer wall whereof is sufficiently thick to provide the vanes 31. The outer wall is supported by a central web 32, which is secured by a key 33. The casing 25 is spaced apart from the said rotor and is held rigidly by side flanges 34 of the heads 35 of the engine.

The heads 35 have incorporated therein, a series of tubular explosion projectors 36. The projectors 36 are preferably integral with said heads, and each has a rounded breech end 37, from which extend inlet branches 38 of said projectors. The projectors are mounted in said heads and in the same plane therein. The long axes of said projectors are pitched at an angle to the radii of the heads. As shown best in Fig. 2 of the drawings, the pitch of the axis of each projector is substantially forty-five degrees to the radius intersecting the axis of the projector and the perimeter of the head. As a result of this construction, the product of the explosion in each of the projectors is delivered against the rotor in a direction approximately corresponding with the rotary movement of said rotor.

The vanes 31 are disposed in the rotor, as seen best in Fig. 2 of the drawings, at an angle inclined from the interior to the exterior backward from the direction of rotation of said rotor. When the vanes 31 coincide with the opening of any one of the projectors at the instant of delivery of expansive medium therefrom, a propulsive impulse is imparted to the rotor by said medium striking on the walls of the vanes.

It will be noted that the vanes 31 are arranged in series, the number of vanes in each series being apportionate to the charge of fuel and the duration of the explosion period thereof.

Opposite the delivery opening of each of the projectors 36, are disposed abutments 28, extending inward from the casing 25 to form a series of passages 29. The passages 29 are open ended, so that the expansive medium when delivered thereinto has exit therefrom to the interior of the casing 25, from which it is sucked by way of the exhaust pipe 27.

It will be noted by reference to Fig. 2, that the channels formed between the vanes 31 are outwardly converged. This formation of the vanes and channels has the effect of gradually expanding the medium prior to its delivery to the passages 29.

As a result of the correlation of the stationary projectors 36, the stationary abutments 28 and the interposed rotor having the vanes 31, the product of the explosion in each of the projectors is expanded twice prior to its liberation within the casing 25. This obtains in engines built in conformity with the present invention, the maximum working effect of the expanding medium.

As above stated, the number of series of vanes 31 may be varied. The number preferred by me is that shown in the drawings, to wit, three series or sets of vanes 31. The fuel supply and ignition system employed in the engine are such that all of the series are approaching or lapping the projectors 36 wherein the explosions are due or made.

To balance the driving impulses on the rotor 30, explosions in three of the projectors 36 occur simultaneously. Each of the series of vanes 31 is acted upon by the expanding medium in its passage from the projectors 36 to the chamber in the casing 25, through the passages 29.

In Figs. 7 to 12 inclusive, an attempt has been made to show the operative relation of one of the series of vanes 31 during a revolution of the rotor 30. In Fig. 7, the vanes 31 are shown as disposed opposite one of the projectors 36, further designated by the letter $a$. The abutments 28 stationed opposite the projector $a$ permit the gas of the explosion within said projector to escape. It will now be seen that the series of vanes 31 is sufficiently lengthened to permit the medium under pressure to pass out of the projector $a$, leaving trapped therein a certain proportion of dead gas. Simultaneous with the explosion of the charge in the projector $a$, explosions occur in the projectors $b$ and $c$.

It will be understood that prior to the explosions in the projectors $a$, $b$ and $c$, there have been explosions in the projectors $d$, $e$ and $f$. When now, as the result of the revolution of the rotor 30, the vanes 31 register with the previously discharged projector $d$, as seen in Fig. 8 of the drawings, the interior of the said projector is exposed to the suction within the chamber of the casing 25. The previously trapped expanded medium is thereby drawn from the projector $d$ and atmospheric air is simultaneously drawn into the projector $d$ through the air intake valve 39, which, as shown best in Fig. 3 of the drawings, is incorporated in the ignition plug 40. The air which passes into the various projectors enters the same through a channel 41. When the valve 39 is lifted, the air gaining access passes to the interior of a casing 42, through perforations 43 therein. The plug 40 has a screw-threaded extension 44 provided with a central passage wherein ignition points 45 are disposed.

Owing to the above arrangement of the ignition points 45 in the path of the incoming air which is used for scavenging the projectors, carbon is prevented from depositing on said points. Each of the valves 39, as seen in Fig. 3 of the drawings, is provided with a stem 46 and a lifting spring 47 which maintain said valves closed. To vary the spark gap, each of the points 45 is attached to a plunger 48, which is retracted and advanced in the inclined housing provided for it.

When, as seen in Fig. 9 of the drawings, the series of vanes 31 progresses to register with the projector $b$ in which is trapped dead gas, said gas is drawn therefrom in the manner as above described with reference to the scavenging of the projector $d$. The particular series of vanes 31 then moves to register with the projector $e$.

It will be understood that the action of the single series of vanes 31 just above described in its effect thereof on the projector $d$, has been duplicated by each of the other two series of vanes 31 on the projectors $e$ and $f$. Therefore, when the series 31 shown in Fig. 8 of the drawings is scavenging the projector $d$, a duplicate series of vanes 31 is performing the same function for the projector $e$.

During the period of time when the series of vanes 31 is traveling from the position shown in Fig. 9 to that shown in Fig. 10, the projectors $e$, $f$ and $d$ are charged with the explosive medium by the operation of the valves 49 which control the passage of said medium from the chambers 50 in the heads 35. Therefore, when the series of vanes 31 shown in Figs. 7 to 12, inclusive, assume the positions shown in Fig. 10, where they register with the projector e, the said projector is charged and ready for firing. The timing of the ignition system is so arranged that at this instant the charge in said projector e is ignited and exploded.

From the foregoing it will be seen that the series of vanes 31 receives rotary impulses from the two series of projectors twice in each revolution of the rotor.

In Fig. 13 of the drawings, the rotor 30 is extended, showing the vanes 31 preferably arranged as two interlapping series on opposite sides of the web 32. When thus arranged, the ignition system is simplified so that the firing of the charges successively on opposite sides of the web may occur, thereby imparting to the rotor four rotary impulses to each revolution.

The explosive fuel employed in the present engine is compressed from any suitable source, and is delivered by pipes 51 to casings 52, as shown best in Fig. 1 of the drawings. The casings 52 are mounted rigidly on the heads 35, being removable therefrom for installation and care of the valves 49. The interiors of the casings 52 communicate through ports 53 with the chambers 50 formed in said heads 35.

The valves 49 are preferably cylindrical in form, and rock to register the passages 55 of the said valves with the ports 54. As seen best in Fig. 3 of the drawings, the registering of the passages 55 with the ports 54 establishes communication with the chambers 50 and the interior of the projectors 36. These valves 49 are each provided with a stem 56, which passes through a stuffing box 57 in the outer wall of the casing 52. The outer end of the stem 56 has a crank arm 58, at the end whereof is a rolling rider 59 to be lifted by the cams 60 on a cam wheel 61, as seen best in Fig. 5 of the drawings. The riders 59 are held on the perimeter of the wheel 61 and cams 61, by the detent spring 62 with which each arm 58 is provided.

As shown best in Figs. 4 and 5, the cam wheel 61 is internally geared to mesh with the teeth on a pinion 63. The pinion 63 is preferably integral with a pinion 64, the teeth whereof are meshed with a gear wheel 65 keyed to the shaft 21 and the reduced end 22 thereof.

As shown in Fig. 5 of the drawings, the arrangement of the cams 60 is such as to lift the arms 58 in groups and said groups in successive relation. Also it will be seen that there are three cams 60 equally spaced on the wheel 61, whereby three of the riders 59 will pass over the said cams simultaneously, rocking the stems 56 with which they are connected, and the valves 49 to charge three of the projectors 36.

To secure the proper timing for the operation of the valves 49, the wheel 65 and pinions 64 and 63 are proportioned to give a ratio of speed to the wheel 61 as three-to-one of the shaft 21 and end 22 thereof. This arrangement insures the rocking of the valves 49 for charging the projectors a, b and c, prior to the vanes lapping the delivery openings of the said projectors, and the abutments 28 oppositely disposed thereto. The arrangement also insures the rocking of the said valves for the proper charging of the second series of projectors d, e and f prior to the second approach or lap thereof by the said vanes 31. This arrangement insures the functioning of the mechanism so that the ignition system may explode the charges thus delivered when said vanes are approaching or at the instant of lapping the delivery opening of the said projectors.

Any suitable form of ignition system employing electric sparking devices, such as the terminals 45, may be employed for igniting the charge in the herein described engine. As shown in Fig. 14 of the drawings, however, the shaft 21 has a series of brushes 70, which engage at proper intervals, terminal blocks 71. The blocks 71 are arranged in two series, the members of one series being connected by a local circuit 72, while the members of the other series are similarly connected by a local circuit 73. The local circuits are each connected by a leg 74, with a battery 75 or other suitable electric source. The shaft 21 and brushes 70 are connected by means of a leg 76 with the other side of the battery 75. Hence, each time the brushes 70 engage the blocks 71 connected with the circuit 73, the spark plugs located on said circuit are energized while the plugs on the circuit 72 being disengaged are dead. When the plugs connected with the circuit 72 are engaged by the brushes 70, the plugs on this circuit are energized while those on the circuit 73 are dead. In this manner there is secured a perfect alternation of the two circuits and of the consequent explosions in the two sets of projectors 36. As shown in the diagram, one set is indicated by the letters a, b and c, while the other set is indicated by the letters d, e and f. It will be noted in the diagram that the set a, b and c explodes when the block 71 in line with the station denoted by the letter a, is engaged, and that the second series is exploded when the short brush 70 engages the block 71 of the inner circle at the lower half of the figure opposite the station marked e. Thus there is secured for each revolution of the shaft 21, two impulses equally separated in point of time for the two series of projectors, the members of which are spaced one hundred and twenty degrees apart.

In Fig. 14 a modified form of valve 66 is shown. The valve 66 is arranged to slide in the inlet branches 38, the stem 56 of each valve being provided with a pin 67 to travel in a cam groove 68 of the cam wheel 69. The wheel 69 is substituted for the wheel 61 in the modified form of the mechanism.

Any suitable means for lubricating the rotor may be employed. As shown in Fig. 2 of the drawings, a series of channels 77 are formed in the heads 35, through which the oil may be circulated from outside the machine to the surface between the rotor 30 and the heads 35. Further, it will be understood that the oil in passing would be picked up by the vanes 31, and carried to the outer side of said rotor to lubricate said outer side and avoid friction between the same and abutments 28.

As seen best in Figs. 3 and 6, circular packing rings are employed to prevent any slight leakage of the gas emitted from the projectors 36. These packing rings preferably consist of lapped and laterally extensible sections 78 and 79, one or both having diagonally pitched slots 80, wherein pins 81 extend. It will be seen that as the section 79 is drawn by the rotor, pins 81 operating through the slots 80, tend to spread the sections 78 and 79, and thereby close the lateral edges of the packing rings against the recesses provided to receive the same.

Claims:

1. An internal combustion engine comprising a cylindrical rotor having a plurality of passages therethrough, said passages being inclined outwardly and backwardly from the direction of rotation of said rotor, said passages being disposed to form groups equally separated; a plurality of tubular projectors having delivery ends normally closed by the body of said rotor to be exposed by the passages therein when in register with said projectors, said projectors being inclined outwardly toward the direction of rotation of said rotor, the number of projectors being twice the number of said groups of passages for forming two series of projectors, each corresponding in spaced relation with the groups of passages; a fuel supply for said projectors; and an ignition system for exploding charges of fuel in said projectors and in the two series thereof alternately.

2. An internal combustion engine comprising a cylindrical rotor having a plurality of passages therethrough, said passages being continuously inclined outwardly and backwardly from the direction of rotation of said rotor, said passages being disposed to form groups equally separated; a plurality of tubular projectors having delivery ends normally closed by the body of said rotor to be exposed by the passages therein when in register with said projectors, said projectors being inclined outwardly toward the direction of rotation of said rotor, the number of projectors being twice the number of said groups of passages, for forming two series of projectors, each corresponding in spaced relation with the groups of passages; a fuel supply for said projectors; an ignition system for exploding charges of fuel in said projectors and in the two series thereof alternately, and an exhaust system embodying suction means for drawing the burnt products from said projectors.

3. An internal combustion engine comprising a cylindrical rotor having pressure vanes forming passages through the wall of said rotor inclined outwardly and backwardly from the direction of rotation of said rotor, said vanes being disposed in three series, said series being disposed in spaced relation; a plurality of projectors, each having an explosion chamber and a delivery end therefrom normally closed by the body of said rotor, said projectors being disposed in series corresponding in spaced relation to said series of vanes; a fuel supply for said projectors; an exhaust system for extracting burned gases from said projectors by suction applied thereto when in register with the passages formed by said vanes; an ignition system embodying a plurality of spark gap terminals, one disposed in each of said projectors; air inlets comprising each a channel for mounting said terminals; and means actuated by the suction of said exhaust for opening said passages.

4. An internal combustion engine comprising a cylindrical rotor having passages through the walls thereof, said passages being disposed in groups having solid walls disposed between said groups, and said passages being inclined outwardly and backwardly from the radii of said rotor; a plurality of power-generating units, each embodying an explosion chamber and an outlet for guiding the products of explosion from said chamber in a path angularly disposed to the radii of said rotor; means for charging said chambers with explosive fuel under pressure; and means for exploding said charges simultaneously in all of the chambers of each group and said groups alternately.

In testimony whereof I have signed my name to this specification in the presence of two subscribing witnesses.

GEORGE JAMES COOPER.

Witnesses:
EDWARD T. PHILLIPS,
L. E. RHODES.